United States Patent
Aboujaib et al.

(10) Patent No.: US 11,834,996 B2
(45) Date of Patent: Dec. 5, 2023

(54) CIRCUIT FOR DRAINING A COMBUSTION CHAMBER AND METHOD FOR DETERMINING THE FAILURE OF SUCH A CIRCUIT

(71) Applicant: GE ENERGY PRODUCTS FRANCE SNC, Belfort (FR)

(72) Inventors: Maher Aboujaib, Belfort (FR); Sven Catrin, Belfort (FR); Ezio Pena, Belfort (FR); Faqihi Bouria, Belfort (FR); Nicolas Couteret, Belfort (FR)

(73) Assignee: GE ENERGY PRODUCTS FRANCE SNC, Belfort (FR)

( * ) Notice: Subject to any disclaimer, the term of this patent is extended or adjusted under 35 U.S.C. 154(b) by 250 days.

(21) Appl. No.: 17/296,158

(22) PCT Filed: Nov. 28, 2019

(86) PCT No.: PCT/FR2019/052833
§ 371 (c)(1),
(2) Date: May 21, 2021

(87) PCT Pub. No.: WO2020/109734
PCT Pub. Date: Jun. 4, 2020

(65) Prior Publication Data
US 2022/0018286 A1 Jan. 20, 2022

(30) Foreign Application Priority Data
Nov. 30, 2018 (FR) ...................................... 18 72164

(51) Int. Cl.
*F02C 7/232* (2006.01)
*F02C 9/46* (2006.01)

(52) U.S. Cl.
CPC ................ *F02C 7/232* (2013.01); *F02C 9/46* (2013.01); *F05D 2220/32* (2013.01); *F05D 2260/602* (2013.01)

(58) Field of Classification Search
CPC .. F02C 7/232; F02C 7/222; F02C 9/46; F23K 15/18; F23K 2300/203; F02K 9/54;
(Continued)

(56) References Cited

U.S. PATENT DOCUMENTS 4,825,198 A * 4/1989 Rolker ................ G01M 3/2876
73/40.5 R
5,042,290 A * 8/1991 Geisinger ........... G01M 3/2892
73/40

(Continued)

OTHER PUBLICATIONS

International Search Report dated Mar. 19, 2020.

*Primary Examiner* — Alain Chau
(74) *Attorney, Agent, or Firm* — IPSILON USA, LLP

(57) ABSTRACT

A circuit (10) for draining at least one combustible fluid for a cavity of a turbine includes a drain (12) in fluidic communication with the at least one cavity, and a first isolation valve (14) and a second isolation valve (16) defining between them an isolation cavity (C) of a portion of the drain. A discharge line (18) is in fluidic communication with the isolation cavity (C) to allow the discharge of air out of the isolation cavity (C). A supply line (22) supplies pressurized fluid to the isolation cavity (C), and a supply valve (24) is arranged in the supply line (22) for regulating the supply of the isolation cavity (C) with pressurized fluid. A discharge valve (20) is arranged in the discharge line (18) for regulating the discharge of the gases out of the isolation cavity (C), and a device (26) is provided for determining a failure of the drainage circuit (10).

11 Claims, 1 Drawing Sheet

(58) Field of Classification Search
CPC .... G01M 15/14; G01M 3/007; F02M 55/007; F05D 2260/66; F05D 2260/602
See application file for complete search history.

(56) References Cited

U.S. PATENT DOCUMENTS

| | | | | |
|---|---|---|---|---|
| 5,557,965 | A * | 9/1996 | Fiechtner | G01M 3/007 73/40.5 R |
| 8,261,595 | B2 * | 9/2012 | Szepek | G01M 3/2876 73/46 |
| 9,121,352 | B2 * | 9/2015 | Montagne | F23K 5/18 |
| 9,404,424 | B2 * | 8/2016 | Morawski | F02C 7/232 |
| 9,909,499 | B2 * | 3/2018 | Nguyen | F02C 7/232 |
| 9,933,327 | B2 * | 4/2018 | Faqihi | G01M 3/025 |
| 10,473,060 | B2 * | 11/2019 | Montagne | F02C 7/232 |
| 10,989,620 | B2 * | 4/2021 | Saha | G01M 3/222 |
| 11,333,075 | B2 * | 5/2022 | Quartieri | B64D 37/32 |
| 2001/0022080 | A1 | 9/2001 | Tanaka et al. | |
| 2011/0100096 | A1 * | 5/2011 | Szepek | G01M 3/2876 73/40.5 R |
| 2011/0146807 | A1 | 6/2011 | Bassmann et al. | |
| 2012/0130553 | A1 * | 5/2012 | Purani | F02C 7/26 700/287 |
| 2012/0137699 | A1 * | 6/2012 | Montagne | F02C 9/40 60/779 |
| 2014/0230402 | A1 * | 8/2014 | Morawski | F02C 7/232 60/39.094 |
| 2015/0285149 | A1 * | 10/2015 | Nguyen | F02C 7/232 60/39.094 |
| 2016/0177878 | A1 * | 6/2016 | Montagne | F02C 7/232 60/779 |
| 2016/0177879 | A1 | 6/2016 | Montagne | |
| 2016/0305276 | A1 * | 10/2016 | Meisl | F02C 7/232 |
| 2017/0052087 | A1 * | 2/2017 | Faqihi | G01M 3/243 |
| 2017/0175638 | A1 | 6/2017 | Mahadik et al. | |
| 2017/0191579 | A1 * | 7/2017 | Tymus | F01D 15/10 |
| 2017/0254270 | A1 * | 9/2017 | Okada | F23R 3/36 |
| 2017/0321608 | A1 * | 11/2017 | Crowley | F02C 7/222 |
| 2019/0094100 | A1 * | 3/2019 | Saha | G01M 3/025 |
| 2020/0141321 | A1 * | 5/2020 | Quartieri | B64D 37/32 |

* cited by examiner

CIRCUIT FOR DRAINING A COMBUSTION CHAMBER AND METHOD FOR DETERMINING THE FAILURE OF SUCH A CIRCUIT

RELATED APPLICATION

This application is a National Phase of PCT/FR2019/052833 filed on Nov. 28, 2019, which claims the benefit of priority from French Patent Application No. 18 72164, filed on Nov. 30, 2018, the entirety of which are incorporated by reference.

FIELD OF THE INVENTION

The present invention concerns a circuit for draining at least one combustible fluid for a turbine, in particular a gas turbine. To be more precise the invention concerns a method of determining a failure of such a drainage circuit.

DESCRIPTION OF RELATED ART

A drainage circuit generally allows evacuation of the combustible fluid in order to prevent all risk of fire or of explosion, in particular in the combustion chambers, the cavities of the gas turbine and the exhaust. A drainage circuit comprises a discharge line and at least one isolation valve.

A gas turbine generally comprises a plurality of combustion chambers and a system for supplying the combustion chambers with combustible fluid.

The supply system allows the combustible fluid, such as liquid fuel oil, to be routed from a storage or distribution system to the combustion chambers. A function of the supply system is to produce the required conditions of filtration, pressure, temperature and flow rate of the combustible fluid supplying the combustion chambers. Moreover, the supply system generally provides means for assuring the reliability of the supply in the event for example of back-pressure stemming from a combustion chamber using check valves at the inlet of the combustion chambers, water purging systems allowing limitation of the risk of coking and a circuit for draining unburned combustible fluid when it is injected into the combustion chambers, in particular in the case of a false start.

The gas turbine may not be started correctly or the flame in the combustion chamber may be extinguished. In these two situations the combustible fluid injected into the combustion chamber may not be burned and therefore accumulates in the aforementioned cavities of the gas turbine. Correct functioning of the drainage circuit or circuits must be verified before firing up the turbine and the combustible fluid must therefore be evacuated from those cavities by one or more drainage circuits following a false start and before a new start-up attempt. However, it can happen that the combustible fluid remains trapped in the drainage circuit and there is therefore a risk of self-ignition in the presence of high temperature. This can in particular occur if the drainage circuit is blocked or a valve of that circuit is faulty.

Installing one or more isolation valves in the drainage circuit is known in the prior art, in particular from the document US 2017/0175638 A1.

However, in the case of failure on closing or opening the isolation valves the combustible fluid may be found in a high temperature zone or cause a leak allowing hot air coming from the combustion chambers to flow through the drainage circuit.

The circuit for draining the cavities allows equally discharging the liquid combustible fluid, for example fuel oil, in the case of a false start, or the washing water. Now, the washing water may transport solid residues of combustion and possibly totally or partially block the drainage circuit of the cavity, or even interfere with the closing of the isolation valve. Thus it is important to be able to detect these various types of possible failures, in particular opening and/or closing of valves in addition to possible obstruction of the drain line.

OBJECTS AND SUMMARY

Thus there exists a need for a solution allowing a failure of the drainage circuit to be determined.

To that end the invention proposes a circuit for draining at least one combustible fluid for a cavity of a turbine, comprising:
- a drain in fluidic communication with said at least one cavity,
- a first isolation valve and a second isolation valve defining between them an isolation cavity of a portion of the drain,
- a discharge line in fluidic communication with the isolation cavity to allow the discharge of air out of the isolation cavity,
- a supply line for supplying pressurized fluid to the isolation cavity,
- a supply valve arranged in the supply line for regulating the supply of the isolation cavity with pressurized fluid,
- a discharge valve arranged in the discharge line for regulating the discharge of air out of the isolation cavity, and
- a device for determining a failure of the drainage circuit.

The implementation of a pressurized fluid supply line inside an isolation cavity formed in the drain allows a pressurized liquid to be injected inside the isolation cavity to determine the failure of the isolation valves or obstruction of the drainage circuit. In particular, it is possible to detect a failure of one or more of the valves forming the isolation cavity, in particular an opening and/or closing fault.

Moreover, the configuration of the drainage circuit allows a potential failure to be determined even if the drain is blocked, for example before starting the turbine.

The drainage circuit may also have one or more of the following features in any technically permissible combination.

In accordance with one embodiment of the drainage circuit, the device for determining a failure may comprise at least one sensor for determining the pressure inside the isolation cavity.

In accordance with one embodiment of the drainage circuit, the device for determining a failure may further comprise a controller configured to control the selective opening or closing of at least one of the first isolation valve, the second isolation valve, the supply valve and the discharge valve.

In accordance with one embodiment of the drainage circuit, the drain may be inclined relative to a horizontal axis in such a manner as to cause said at least one combustible fluid to flow under gravity inside the drain.

In accordance with one embodiment of the drainage circuit, the discharge line may discharge at the level of the first half of the isolation cavity relative to the direction of flow of said at least one combustible fluid through the drain.

In accordance with one embodiment of the drainage circuit, the drainage circuit may further comprise an additional supply valve arranged in the supply line to isolate a portion of the supply line between the supply valve and the additional supply valve, and a sensor for determining the pressure inside the portion of the supply line.

In accordance with one embodiment of the drainage circuit, the drainage circuit may further comprise an additional discharge valve arranged in the discharge line to isolate a portion of the discharge line between the discharge valve and the additional discharge valve, and a sensor for determining the pressure inside the portion of the discharge line.

The invention further concerns a method for determining a failure for a drainage circuit as described hereinabove of at least one combustible fluid for a cavity of a turbine, the method comprising the following steps:
  closing the first and second isolation valves to isolate the isolation cavity from the rest of the drain;
  opening the supply valve to inject pressurized fluid inside the isolation cavity;
  opening the discharge valve in such a manner as to allow the evacuation of gas during the injection of the pressurized fluid inside the isolation cavity;
  closing the supply valve when the isolation cavity is filled with pressurized fluid;
  closing the discharge valve;
  opening one of the first and second isolation valves;
  determining a failure of the drainage circuit as a function of the evolution of the pressure inside the isolation cavity when opening said first or second isolation valve.

In accordance with one embodiment of the determination method, the steps of closing the first and second isolation valves, opening the supply valve, where applicable opening the discharge valve, where applicable closing the discharge valve, closing the supply valve, opening one of the first and second isolation valves and determining a failure may be successively executed a first time to determine a failure of the drainage circuit on opening the first isolation valve and a second time to determine a failure of the drainage circuit on opening the second isolation valve, the first isolation valve being closed between those first and second times.

In accordance with one embodiment of the determination method, the step of determining a failure may comprise:
  determining a reference pressure value corresponding to the pressure inside the isolation cavity after closing the supply valve,
  determining a time elapsed between the opening of said first isolation valve or second isolation valve and the moment at which the pressure inside the isolation cavity reaches a predetermined pressure value,
  determining a failure of the drainage circuit as a function of said elapsed time.

In accordance with one embodiment of the determination method, a failure corresponding to a fault on opening said first or second isolation valve may be determined if the elapsed time is greater than or equal to a predetermined time.

In accordance with one embodiment of the determination method, the drainage circuit further comprising an additional supply valve arranged in the supply line to isolate a portion of the supply line between the supply valve and the additional supply valve, and a sensor for determining the pressure inside the portion of the supply line.

In this embodiment:
  the step of opening the supply valve further may comprise opening the additional supply valve,
  the step of closing the supply valve may further comprise closing the additional supply valve when the isolation cavity is filled with pressurized fluid, and
  the method may further comprise the following steps when the first and second isolation valves, the supply valve and the additional supply valve are closed:
    determining a failure of the supply valve as a function of the evolution of the pressure inside the portion of the supply line.

In accordance with one embodiment of the determination method, the drainage circuit further comprising an additional discharge valve arranged in the discharge line to isolate a portion of the discharge line between the discharge valve and the additional discharge valve, and a sensor for determining the pressure inside the portion of the discharge line.

In this embodiment:
  the step of opening the discharge valve may further comprise opening the additional discharge valve,
  the step of closing the discharge valve may further comprise closing the additional discharge valve,
  the method may further comprise the following steps when the first and second isolation valves, the supply valve, the discharge valve and the additional discharge valve are closed:
    determining a failure of the discharge valve as a function of the evolution of the pressure inside the portion of the discharge line.

The concept of the invention is described more completely hereinafter with reference to the appended drawings in which embodiments of the concept of the invention are shown. In the drawings, the size and the relative sizes of the elements may be exaggerated for clarity. Similar numbers refer to similar elements in both the drawings. However, this concept of the invention may be implemented in numerous different forms and should not be interpreted as being limited to the embodiments explained here. Rather than that, these embodiments are proposed so that this description is complete and communicates the extent of the concept of the invention to the person skilled in the art. The invention is not limited to the embodiments illustrated in the drawings.

A reference throughout the specification to "an embodiment" signifies that a functionality, a structure or a particular feature described with reference to one embodiment is included in at least one embodiment of the present invention. Thus the occurrence of the expression "in one embodiment" at various places throughout the specification does not necessarily refer to the same embodiment. Moreover, the functionalities, the structures or the particular features may be combined in any appropriate manner in one or more embodiments.

BRIEF DESCRIPTION OF THE DRAWINGS

The appended drawings illustrate the invention.

DETAILED DESCRIPTION

Figure 1:
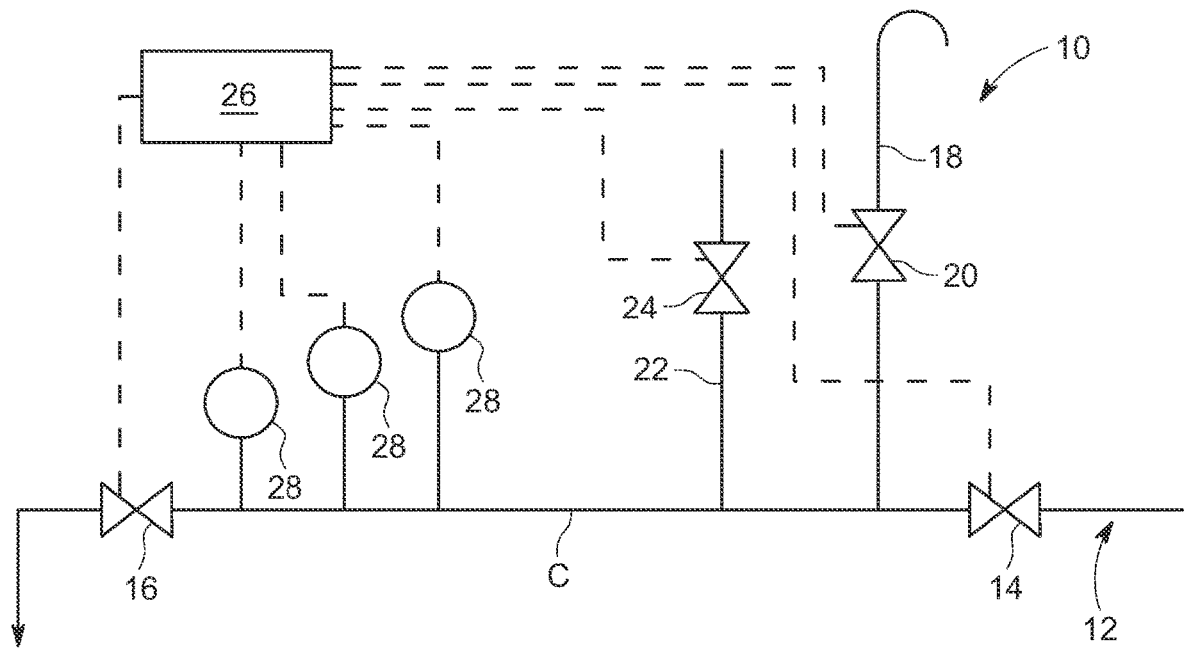
FIG. 1 represents schematically a first embodiment of a circuit for draining one or more cavities of a turbine.

A first embodiment of a drainage circuit 10 is shown in FIG. 1. The drainage circuit 10 allows at least one combustible fluid to be drained from least one cavity of a turbine, in particular a gas turbine. The gas turbine preferably comprises a plurality of combustion chambers. The combustible fluid is preferably liquid fuel oil.

The combustible fluid is mixed with compressed air inside the combustion chamber to be burned. The gas resulting from this combustion drives a turbine thus allowing the kinetic energy linked to the rapid expansion of the gas to be converted into mechanical energy usable at the level of an output shaft.

As described above, the drainage circuit 10 allows evacuation from a cavity, for example the combustion chamber, of the unburned combustible fluid, for example in the case of failure of the gas turbine to fire up. The drainage circuit 10 is preferably an accessory circuit and therefore independent of the cavity. In other words, the drainage circuit 10 does not comprise said at least one cavity of the turbine but is configured to be in fluidic communication with at least one of them to collect a fluid coming from at least one of those cavities.

The drainage circuit 10 comprises a drain 12 intended to be in fluidic communication with said at least one cavity (which is not visible). The drain 12 is preferably inclined relative to a horizontal axis in such a manner as to cause said at least one combustible fluid to flow under gravity inside the drain 12. Thus the combustible fluid evacuated from the cavity is distanced more easily from the high temperature zone, which limits the risks of self-ignition of the combustible fluid.

The drainage circuit 10 equally comprises a first isolation valve 14 and a second isolation valve 16 delimiting between them an isolation cavity C. This isolation cavity C corresponds to a portion of the drain 12 between the first isolation valve 14 and a second isolation valve 16. The first isolation valve 14 and the second isolation valve 16 are arranged in series along the drain 12. Moreover, the first isolation valve 14 is disposed upstream of the second isolation valve 16 relative to the direction of flow of said at least one combustible fluid through the drain 12. Thus when the drain 12 is inclined relative to the horizontal the first isolation valve 14 is in a high position and the second isolation valve 16 is in a low position.

The drainage circuit 10 also comprises a pressurized fluid supply line 22. The supply line 22 is in fluidic communication with the isolation cavity C to allow supply of pressurized fluid to the isolation cavity C. The supply line 22 is intended to be connected to a source (which is not visible) of pressurized fluid. The pressurized fluid is preferably water. A supply valve 24 is arranged in the supply line 22 to allow regulation of the supply of pressurized fluid to the isolation cavity C. The isolation cavity C can therefore be selectively filled with fluid at a required pressure. This is particularly useful for testing the correct functioning or the seal of at least one of the valves of the drainage circuit 10 or obstruction thereof.

The drainage circuit 10 further comprises a discharge line 18 to allow the discharge of air from the isolation cavity C. The discharge line 18 may be a vent connected to the isolation cavity C. The discharge line 18 preferably discharge at the level of the first half of the isolation cavity C relative to the direction of flow of said at least one combustible fluid through the drain 12. In other words, the discharge line 18 discharges near the first isolation valve 14. This high position of the discharge valve 18 allows air or an inert gas to escape from the isolation cavity C when the latter is filled with pressurized fluid. A discharge valve 20 is arranged in the discharge line 18 to allow regulation of the discharge of air from the isolation cavity C.

The discharge valve 20, the supply valve 24 and the first and second isolation valves may be configured so that the opening and the closing thereof are regulated manually or automatically. All the valves of the drainage circuit are preferably configured to be controlled automatically by a controller 26 to obtain selectively activatable opening/closing of each of them.

The drainage circuit 10 equally comprises a device 26 for determining a failure of the drainage circuit 10. In particular, the determination device 26 is configured to carry out a test sequence on the first valve 14 or on the second valve 16 by means of the supply of pressurized fluid. By obstructing the isolation cavity C and then filling it with pressurized fluid, the device 26 for determining a failure allows detection of a failure of one or more valves of the isolation cavity C or blocking of the drain 12 as a function of the evolution of the pressure inside the isolation cavity C. To this end, the device 26 for determining a failure preferably comprises at least one sensor 28 configured to determine the pressure inside the isolation cavity C. Alternatively, the device 26 for determining a failure may comprise one or more sensors 28 allowing determination of the pressure inside the isolation cavity C, in particular to obtain measurement redundancy.

By "failure" of the drainage circuit 10 is meant dysfunctional opening or closing of a valve of this drainage circuit and/or total or partial obstruction of the drain 12.

To allow monitoring of the opening/closing of the valves of the drainage circuit 10 the device 26 for determining a failure preferably comprises a controller configured to monitor the selective opening or closing of at least one of the first isolation valve 14, the second isolation valve 16, the supply valve 24 and the discharge valve 20. The controller is preferably configured to control the selective opening or closing of all of the valves of the drainage circuit 10. Moreover, the controller is configured to control the selective opening or closing of the valves independently of one another. The controller is moreover configured to receive the pressure values determined by the sensor or sensors 28.

The test sequence or the determination of a failure of the drainage circuit 10 is preferably carried out in accordance with the following method. This method is executed when the gas turbine is stopped. Moreover, the method is preferably executed before starting the gas turbine in order to verify the correct functioning of the drainage circuit 10. The following valve opening or closing steps may be carried out wholly or in part manually or preferably automatically by the controller of the device 26 for determining a failure.

In the initial or operational state of the drainage circuit 10 the first isolation valve 14 and the second isolation valve 16 are generally open. The first isolation valve 14 and the second isolation valve 16 are therefore first closed to isolate the isolation valve C from the rest of the drain 12.

The supply valve 24 is then opened to inject pressurized fluid inside the isolation cavity C. The discharge valve 20 is preferably opened at the same time as or after the supply valve 24 in such a manner as to allow the discharge of air when injecting pressurized fluid inside the isolation cavity C.

When the isolation cavity C is filled with pressurized fluid the supply valve 24 is closed. The discharge valve 20 is closed at the same time as closing the supply valve 24. Alternatively, the discharge valve 20 may be closed shortly before the supply valve 24 is closed. The isolation cavity C is considered filled when the pressure inside the isolation cavity C reaches a target pressure. This target pressure may be measured with the aid of the sensor 28 arranged in the isolation cavity C.

When the supply valve 24 and the discharge valve 20 are closed the pressure inside the isolation cavity is determined. This pressure is considered as being a reference pressure value.

One of the first isolation valve 14 and second isolation valve 16 is then opened. For clarity, it will be considered hereinafter that the first isolation valve 14 is opened. A potential failure of the first isolation valve 14 is then determined as a function of the evolution of the pressure inside the isolation cavity C on opening the first isolation valve 14. The device 26 for determining a failure preferably determines the time elapsed between the opening of the first isolation valve 14 and the moment at which the pressure inside the isolation cavity C reaches a predetermined pressure value. A failure of the first isolation valve 14 can therefore be determined as a function of that elapsed time.

Thus if the time elapsed for the pressure inside the isolation cavity C to reach the predetermined pressure is equal to or less than a threshold time, the first isolation valve 14 is considered not to have failed. A contrario, if the time elapsed for the pressure inside the isolation cavity C to reach the predetermined pressure is greater than a threshold time, a failure is determined. This failure may correspond to a first isolation valve 14 opening fault or to blocking of the drain 12 upstream of the first isolation valve 14. In a similar manner, when the second isolation valve 16 is opened in place of the first isolation valve 14 after the determination of the reference pressure, the observations for the first isolation valve 14 apply mutatis mutandis to the second isolation valve 16. In particular, the failure determined may correspond to a second isolation valve 16 opening fault or to blocking of the drain 12 downstream of the second isolation valve 16.

The drain 12 generally has an internal pressure corresponding to atmospheric pressure when the first isolation valve 14 and second isolation valve 16 are open. In this case the predetermined pressure value corresponds to atmospheric pressure. In other words, the elapsed time corresponds to the time taken for the pressure inside the isolation cavity C to reach atmospheric pressure after opening the valve.

This test sequence for the first isolation valve 14 may be applied interchangeably to the first isolation valve 14 or to the second isolation valve 16. The method is preferably executed at least twice in succession to determine a failure of the drainage circuit 10 in the case of opening the first isolation valve 14 and then the second isolation valve 16.

Thus between two executions of the method the first isolation valve 14 is closed once the step of determining a failure has been carried out. The supply valve 24 is opened again conjointly with the discharge valve 20 to fill the isolation cavity C with pressurized fluid and to evacuate air therefrom. The supply valve 24 and the discharge valve 20 are then closed when the pressure inside the isolation cavity C reaches the target pressure. The reference pressure value is determined and the second isolation valve 16 is then opened to be able to determine a potential failure thereof. A failure of the second isolation valve 16 or blocking of the drain 12 is determined in the same manner as that described hereinabove for the first isolation valve 14.

On completion of the method for determining a failure the first isolation valve 14 and the second isolation valve 16 are opened in such a manner as to place the drainage circuit 10 in an operational state, i.e. a state in which the unburned combustible fluid is discharged through the drain 12, possibly to start the gas turbine.

The device 26 for determining a failure preferably transmits to a control unit of the gas turbine information representing the correct functioning or the failure of the drainage circuit 10. Thus whether to start the turbine may be determined as a function of the state of the drainage circuit 10. An alarm or a visual indicator may also be triggered when the drainage circuit 10 is determined to have failed.

Figure 2:
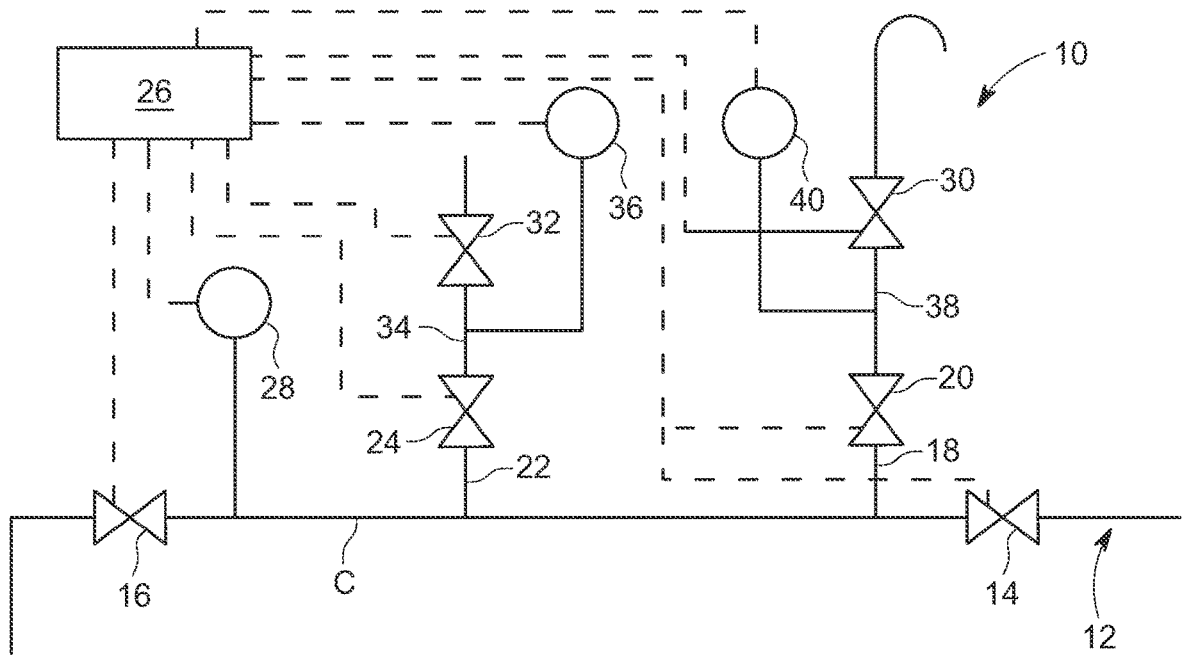
FIG. 2 represents schematically a second embodiment of a circuit for draining one or more cavities of a turbine.

A second embodiment of a drainage circuit 10 is shown in FIG. 2. The drainage circuit 10 of the second embodiment differs from the drainage circuit of the first embodiment in that an additional discharge valve 30 and an additional supply valve 32 are respectively added to the discharge line 18 and the supply line 22.

The additional supply valve 32 is arranged in the supply line 22 to isolate a portion of the supply line 34 between the supply valve 24 and the additional supply valve 32. A first additional sensor 36 allows the pressure inside the portion of the supply line 34 to be determined. In a similar manner the additional discharge valve 30 arranged in the discharge line 18 to isolate a portion of the discharge line 38 between the discharge valve 20 and the additional discharge valve 30. A second additional sensor 40 allows the pressure inside the portion of the discharge line 38 to be determined.

The discharge valve 20 is arranged between the additional discharge valve 30 and the isolation cavity C. In a similar manner the supply valve 24 is arranged between the additional supply valve 32 and the isolation cavity C.

This arrangement forming two isolated portions in the supply line 22 and the discharge line 18 in which the pressure can be determined allows testing of correct functioning of the supply valve 24 and the discharge valve 20. In other words, the possibility of determining the evolution of the pressure upstream and downstream of the supply valve 24 and the discharge valve 20 allows a potential failure of those valves to be determined when filling the isolation cavity C as in the method described hereinabove. In fact, a variation of pressure between the portions of the supply line 34 and the discharge line 38 makes it possible to determine whether the supply valve 24 and/or the discharge valve 20 has failed. In particular, if the pressure determined by the sensor 28, the first additional sensor 36 and the second additional sensor 40 is stable when the isolation cavity C is at the reference pressure then the first isolation valve 14, the second isolation valve 16, the supply valve 24 and the discharge valve 20 are properly sealed. If only the pressure inside the isolation cavity C decreases then a failure of the first valve 14 and/or of the second isolation valve 16 is determined by the method of the first embodiment.

The controller of the device 26 for determining a failure is also configured to control the selective opening or closing of the additional supply valve 32 and the additional discharge valve 30. The controller is moreover configured to receive the pressure values determined by the first additional sensor 36 and the second additional sensor 40.

To implement the second embodiment the method described hereinabove may be used in identical manner with the following adaptations: the step of opening the supply valve 24 further comprises opening the additional supply valve 32 and the step of closing the supply valve 24 further comprises closing the additional supply valve 32 when the isolation cavity C is filled with pressurized fluid. In a similar manner the step of opening the discharge valve 20 further comprises opening the additional discharge valve and the step of closing the discharge valve 20 further comprises closing the additional discharge valve 30.

The correct functioning of the supply valve 24 or of the discharge valve may be determined as a function of the evolution of the pressure inside the portion of the supply line 34 and the portion of the discharge line 38, respectively. As indicated hereinabove if the pressure determined by the sensor 28 and the first additional sensor 36 and the second additional sensor is stable when the isolation cavity C is at the reference pressure then the supply valve 24 and the discharge valve 20 are considered as properly sealed.

The invention claimed is:

1. A method for determining a failure for a drainage circuit for draining at least one combustible fluid for at least one cavity of a turbine, comprising:
    a drain in fluidic communication with said at least one cavity of a turbine,
    a first isolation valve and a second isolation valve defining between them an isolation cavity of a portion of the drain,
    a discharge line in fluidic communication with the isolation cavity to allow the discharge of air out of the isolation cavity,
    a supply line for supplying pressurized fluid to the isolation cavity,
    a supply valve arranged in the supply line for regulating the supply of the isolation cavity with pressurized fluid,
    a discharge valve arranged in the discharge line for regulating the discharge of the gases out of the isolation cavity, and
    a device for determining a failure of the drainage circuit having at least one sensor for determining the pressure inside the isolation cavity,
    said method comprising the following steps:
        closing the first isolation valve and second isolation valve to isolate the isolation cavity from the rest of the drain;
        opening the supply valve to inject pressurized fluid inside the isolation cavity;
        opening the discharge valve in such a manner as to allow the evacuation of gas during the injection of the pressurized fluid inside the isolation cavity;
        closing the supply valve when the isolation cavity is filled with pressurized fluid;
        closing the discharge valve;
        opening one of the first isolation valve and second isolation valve;
        determining a failure of the drainage circuit as a function of the variation of the pressure inside the isolation cavity when opening said first isolation valve or second isolation valve.

2. The determination method as claimed in claim 1, in which the device for determining a failure further comprises a controller configured to control the selective opening or closing of at least one of the first isolation valve, the second isolation valve, the supply valve and the discharge valve.

3. The determination method as claimed in claim 1, in which the drain is inclined relative to a horizontal axis in such a manner as to cause said at least one combustible fluid to flow under gravity inside the drain.

4. The determination method as claimed in claim 1, in which the discharge line discharges from the isolation cavity near said first isolation valve.

5. The determination method as claimed in claim 1, further comprising an additional supply valve arranged in the supply line to isolate a portion of the supply line between the supply valve and the additional supply valve, and a sensor for determining the pressure inside the portion of the supply line.

6. The determination method as claimed in claim 1, further comprising an additional discharge valve arranged in the discharge line to isolate a portion of the discharge line between the discharge valve and the additional discharge valve, and a sensor for determining the pressure inside the portion of the discharge line.

7. The determination method as claimed in claim 1, in which the steps of closing the first isolation valve and second isolation valve, opening the supply valve, opening the discharge valve when the discharge valve is closed, where applicable closing the discharge valve when the discharge valve is opened, closing the supply valve, opening one of the first isolation valve and the second isolation valve and determining a failure are successively executed a first time to determine a failure of the drainage circuit on opening the first isolation valve and a second time to determine a failure of the drainage circuit on opening the second isolation valve, the first isolation valve being closed between those first and second times.

8. The determination method as claimed in claim 1, in which the step of determining a failure comprises:
    determining a reference pressure value corresponding to the pressure inside the isolation cavity after closing the supply valve,
    determining a time elapsed between the opening of said first isolation valve or second isolation valve and the moment at which the pressure inside the isolation cavity reaches a predetermined pressure value,
    determining a failure of the drainage circuit as a function of said elapsed time.

9. The determination method as claimed in claim 8, in which a failure corresponding to a fault on opening said first isolation valve or second isolation valve is determined if the elapsed time is greater than or equal to a predetermined time.

10. The determination method as claimed in claim 1, the drainage circuit further comprising an additional supply valve arranged in the supply line to isolate a portion of the supply line between the supply valve and the additional supply valve, and a sensor for determining the pressure inside the portion of the supply line, in which:
    the step of opening the supply valve further comprises opening the additional supply valve,
    the step of closing the supply valve further comprises closing the additional supply valve when the isolation cavity is filled with pressurized fluid, and the method further comprises the following steps when the first isolation valve and second isolation valve, the supply valve and the additional supply valve are closed:
    determining a failure of the supply valve as a function of the variation of the pressure inside the portion of the supply line.

11. The determination method as claimed in claim 1, the drainage circuit further comprising an additional discharge valve arranged in the discharge line to isolate a portion of the discharge line between the discharge valve and the additional discharge valve, and a sensor for determining the pressure inside the portion of the discharge line, in which:
    the step of opening the discharge valve further comprises opening the additional discharge valve,
    the step of closing the discharge valve further comprises closing the additional discharge valve, and the method further comprises the following steps when the first isolation valve, the second isolation valve, the supply valve, the discharge valve and the additional discharge valve are closed:
    determining a failure of the discharge valve as a function of the evolution variation of the pressure inside the portion of the discharge line.

* * * * *